(12) United States Patent
Zapletal

(10) Patent No.: US 11,865,895 B2
(45) Date of Patent: Jan. 9, 2024

(54) ACCUMULATOR, OPTIONALLY IN COMBINATION WITH AN INTERNAL HEAT EXCHANGER IN A SHARED HOUSING

(71) Applicant: Hanon Systems, Daejeon (KR)

(72) Inventor: Jiri Zapletal, Ostrava-Poruba (CZ)

(73) Assignee: HANON SYSTEMS, Daejeon (KR)

( * ) Notice: Subject to any disclaimer, the term of this patent is extended or adjusted under 35 U.S.C. 154(b) by 486 days.

(21) Appl. No.: 17/266,313

(22) PCT Filed: Aug. 14, 2019

(86) PCT No.: PCT/KR2019/010342
§ 371 (c)(1),
(2) Date: Feb. 5, 2021

(87) PCT Pub. No.: WO2020/040476
PCT Pub. Date: Feb. 27, 2020

(65) Prior Publication Data
US 2021/0300149 A1   Sep. 30, 2021

(30) Foreign Application Priority Data

Aug. 22, 2018 (DE) ............... 10 2018 214 178.9

(51) Int. Cl.
  *B60H 1/00* (2006.01)
  *B04C 5/06* (2006.01)
  *B04C 9/00* (2006.01)
  *B33Y 80/00* (2015.01)

(52) U.S. Cl.
CPC ........... *B60H 1/00492* (2013.01); *B04C 5/06* (2013.01); *B04C 9/00* (2013.01); *B60H 1/00335* (2013.01); *B33Y 80/00* (2014.12)

(58) Field of Classification Search
CPC .. B60H 1/00492; B60H 1/00335; B04C 5/06; B04C 9/00; B33Y 80/00; F25B 43/02; F25B 31/002; F25B 43/006; F25B 2400/03; F25B 2400/02; F25B 2309/06
USPC .......................................................... 165/10
See application file for complete search history.

(56) References Cited

U.S. PATENT DOCUMENTS

| 3,589,395 A | 6/1971 | Bottum |
| 4,651,540 A * | 3/1987 | Morse ............ F25B 43/006 |
| | | 96/198 |
| 6,463,757 B1 * | 10/2002 | Dickson .......... F25B 43/006 |
| | | 62/509 |
| 7,918,107 B2 | 4/2011 | Klotten et al. |

(Continued)

FOREIGN PATENT DOCUMENTS

| CN | 103245143 A | 8/2013 |
| DE | 2709343 A1 | 9/1977 |

(Continued)

*Primary Examiner* — Justin M Jonaitis
(74) *Attorney, Agent, or Firm* — Shumaker, Loop & Kendrick, LLP; James D. Miller

(57) ABSTRACT

An accumulator in combination with an internal heat exchanger in a shared housing, the accumulator including a cyclone for separation of the gas and liquid phase of a refrigerant, wherein the cyclone includes two separate, curved flow paths, one of which leads from an inlet on the cover side whose direction of flow is closer to the axial than the radial direction of the cyclone into the accumulator and radially outwards, and the other of which leads outwards from an end facing away from the cover.

12 Claims, 2 Drawing Sheets

(56) References Cited

U.S. PATENT DOCUMENTS

| | | | | |
|---|---|---|---|---|
| 2002/0095948 A1* | 7/2002 | Corrigan | ............... | B01D 45/16 |
| | | | | 62/503 |
| 2008/0223073 A1* | 9/2008 | Fralick | ................. | F25B 43/006 |
| | | | | 62/503 |
| 2009/0044563 A1* | 2/2009 | Heckt | .................. | F25B 43/006 |
| | | | | 62/503 |
| 2012/0151957 A1* | 6/2012 | Kamiyama | ........... | F25B 43/006 |
| | | | | 62/430 |
| 2014/0352270 A1 | 12/2014 | Pan et al. | | |
| 2015/0345844 A1* | 12/2015 | Köster | ................. | F25B 31/004 |
| | | | | 62/512 |

FOREIGN PATENT DOCUMENTS

| | | |
|---|---|---|
| DE | 3127317 A1 | 1/1983 |
| EP | 2469202 A2 | 6/2012 |
| EP | 3255361 A1 | 12/2017 |
| JP | S62228850 A | 10/1987 |
| JP | H0480314 B2 | 12/1992 |
| JP | 2008111654 A | 5/2008 |
| JP | 2008215727 A | 9/2008 |
| JP | 2018017407 A | 2/2018 |
| KR | 20070099759 A | 10/2007 |
| WO | 2012026004 A1 | 10/2013 |
| WO | 2016136288 A1 | 9/2016 |

* cited by examiner

ACCUMULATOR, OPTIONALLY IN COMBINATION WITH AN INTERNAL HEAT EXCHANGER IN A SHARED HOUSING

CROSS-REFERENCE TO RELATED APPLICATIONS

This patent application is a United States nation phase patent application based on PCT/KR2019/010342 filed on Aug. 14, 2019, which claims the benefit of German Patent Application No. DE 10 2018 214 178.9 filed on Aug. 22, 2018, the entire disclosures of which are hereby incorporated herein by reference.

TECHNICAL FIELD

The invention relates to an accumulator having a cyclone for separation of the gas and liquid phase of a refrigerant, in particular of a vehicle air-conditioning system.

Air-conditioning systems typically comprise refrigerant stores in which the liquid phase is separated from the gaseous phase by means of centrifugal forces that are generated by the cyclone. These stores are also known as collectors, as they collect and store a variable quantity of liquid refrigerant while the gaseous phase is being fed into the refrigerant circuit. The accumulator also has the function of adding a defined quantity of oil to the gas phase of the refrigerant before the refrigerant enters the further course of the refrigerant circuit.

BACKGROUND ART

Such an accumulator is described in US 2015/0345844 Al, for instance. Particularly high requirements are made on the accumulator, especially when liquid carbon dioxide typically known as R744 is used as the refrigerant. It should be emphasized, however, that the invention can also be used in connection with other refrigerants, such as for instance R134 and R1234yf.

In addition to the likewise known arrangement according to US 2009/0044563 Al, the aforementioned US 2015/0345844 Al describes a radial cyclone which gives the refrigerant flow a rotating or spiral form, so that the gas phase can be separated from the liquid phase. However, such a cyclone is comparatively complex to manufacture, and there is a considerable risk of damage during assembly. The applicant therefore turned consideration to a cyclone having an axial inlet.

Disclosure of Invention

Against this background, the object of the invention is to simplify an accumulator in respect of the discharge of the gas phase of the refrigerant.

The accumulator accordingly comprises a cyclone comprising two separate, curved flow paths, one of which leads from an inlet on the cover side whose direction of flow is closer to the axial than the radial direction of the cyclone into an accumulator and radially outwards, so that a rotating flow is generated, and the other of which leads out of the accumulator at least predominantly radially or at least predominantly axially from an end facing away from the cover. In the case of an accumulator without a heat exchanger, the gas phase of the refrigerant thereby reaches the outside of the accumulator. If the accumulator is combined with a heat exchanger, the gas phase of the refrigerant goes out of the accumulator into the heat exchanger. In the case of an accumulator with a heat exchanger, the described other flow path leads tangentially outwards, so that it has a radial component, while in the case of an accumulator without a heat exchanger it can likewise lead substantially axially out of the accumulator. It should be mentioned at this point that the invention concerns in particular the design of the cyclone. In particular, an accumulator according to the invention can be combined with a heat exchanger. The heat exchanger can be referred to as an internal or integrated heat exchanger, since the accumulator and heat exchanger are provided in a shared housing that can also be referred to as a pressure vessel. Reference is made in the following primarily to an accumulator, but it must be understood that the cyclone can be provided for an accumulator with or without a heat exchanger.

Advantageously it is an axial cyclone, since the inlet has a direction of flow closer to the axial than the radial direction of the cyclone. In particular, the inlet formed in a cover can run entirely axially. An inclined flow path can then be provided in the direction of the cyclone in order to deflect the flow into a suitable direction for the flow rotating in the cyclone as described below. The inclined flow path typically runs tangentially and thereby has a radial component.

The inlet flow is substantially given to rotate by the cyclone, so that a vortex flow is generated, the flow leads radially outwards and the refrigerant leaves the cyclone in a substantially tangential direction. Where reference is made in this description to the axis of the cyclone and the axial and radial direction, it must be understood that the axis of the cyclone is essentially the axis of rotation of the flow describing a circular or spiral track at least in some portions.

According to the invention, the cyclone has a second, similar flow path, the inlet of which faces away from a cover of the collector and which leads the refrigerant out of the accumulator. In this area the gas phase of the refrigerant, which was provided with oil on a bottom of the accumulator, in other words at an end facing away from the cover, can enter the cyclone in a substantially axial direction. This flow is also given to rotate by a suitable design, so that the flow leaves the cyclone at a suitable point again in a tangential direction and subsequently leaves the accumulator. In the case that the cyclone is provided in an accumulator with a heat exchanger, the flow can subsequently take place in a substantially tangential direction and in an annular gap in which a spiral tube is provided, for instance for the exchange of heat. This and the rotating flow increase the output of the heat exchanger. In the case of an accumulator without a heat exchanger, refrigerant remaining in the liquid state is removed by the rotating flow.

The cyclone according to the invention thereby causes two flow paths in substantially opposing directions to be combined in a single component, and the design of the cover, which so far had the second flow path described above, can be considerably simplified. Thus the side of the helix already present that faces away from the cover, in other words the "other" side, is used. This further allows the space required to be reduced and, if the size of the accumulator remains the same, the volume available for storing the refrigerant can be enlarged. Furthermore, the cost of materials can be reduced, and the loss of pressure can be minimized. Further advantages exist in that the cyclone has a comparatively simple construction and can be manufactured at low cost e.g. through injection moulding from plastic. In contrast to a radial cyclone having a tangential inlet tube, assembly of the cyclone is also made easier, since the tangential inlet tube does not hinder assembly and the axial inlet according to the invention is extremely unlikely to be damaged during assembly. Furthermore, a standardized cyclone can be used for accumulators of different sizes.

Advantageous developments of the accumulator according to the invention are further described herein.

In respect of the cover-side inlet into the cyclone, the current preference is for its axis or direction of flow to be within about 45 degrees, preferably about 25 degrees, of the axial direction of the cyclone.

A particularly reliable flow within the cyclone is achieved if at least one and preferably both flow paths are spiral or helical at least in some portions.

Preferably, one flow path of the cyclone forms the inlet of the accumulator and/or the outlet of the other flow path forms the outlet of the accumulator. In order to design the tangential flow component at the outlet of at least one flow path of the cyclone to be particularly pronounced relative to the axial flow component, the preference is for at least the outlet of at least one flow path to extend significantly further in the radial than in the axial direction of the cyclone.

The design of the cyclone can be kept particularly simple by separating the flow paths from each other by a single partition, guide vane or blade. Any partitions between the flow paths typically run helically or spirally.

In particular, such a single partition, but also any other wall limiting the flow in an axial direction, can advantageously run substantially perpendicular to the axis of the cyclone at at least one outlet of the cyclone, in particular at the inlet of the accumulator.

As already mentioned, the manufacturing costs can be kept particularly low by making the cyclone out of plastic, particularly out of a polymer, and/or injection moulding it or printing it in 3D. However, the cyclone can also consist of metal, a composite material or another suitable material.

Advantageously, the new way of designing the cyclone for the accumulator according to the invention consequently allows the provision of a cover having a single flow path for refrigerant and whose construction is accordingly particularly simple, Assembly of the cover can be designed to be particularly safe and free of faults if it is executed in asymmetric form.

BRIEF DESCRIPTION OF THE DRAWINGS

Exemplary embodiments of the invention as represented in the figures are explained in more detail below. Illustrations.

Mode For The Invention

Figure 1:
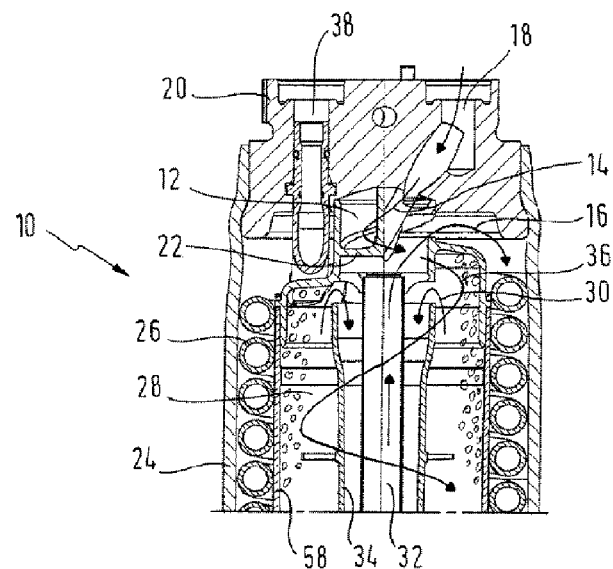
FIG. 1 Section through a part of the accumulator according to the invention with a heat exchanger and cyclone.

As can be seen in FIG. 1, the accumulator 10 according to the invention with a heat exchanger initially comprises a housing 24 and a cover 20. Within the housing 24, a spiral tube 26 is provided which serves to allow the passage of a medium, typically a high-temperature refrigerant, with which the refrigerant flowing out of the cyclone and typically having a low temperature exchanges heat. The heat exchanger is thereby formed by the housing 24, a first middle tube 58, the spiral tube 26 located between them, the cover 20 and a bottom not visible in the figure. The separator 28 is located within the middle tube 58, and the cover 20, the bottom and the housing 24 form the pressure vessel or the pressure container for the accumulator 10 combined with a heat exchanger.

Thereby provided radially within is the separator 28 in whose radial outer area the gas phase is separated from the liquid phase by means of centrifugal force. This is indicated by the droplets located radially outside. In the lower area not shown of the separator 28, a defined quantity of oil is added to the gas flow that is indicated by the arrow 30. Out of this lower area, the gas is led upwards through the inner tube 32 of the separator 28 after, as mentioned, having been led outside the inner tube 32 and within a middle tube 34 to the lower area.

At the (upper) outlet of the inner tube 32 a deflector (56, cf. FIGS. 2, 5 and 6) connected with it can be provided. FIG. 1 shows the cyclone 12, the inlet for which is to be described first. This is supplied with refrigerant by a flow path provided in the cover 20, whereby the flow path is significantly closer to the axial (vertical in the figure) direction than the radial direction of the cyclone. The refrigerant flow is given to rotate by a suitable design of the partition 22 so that the refrigerant, as indicated by the arrow 36, flows radially into the separator 28 and the liquid phase is separated and stored. The flow of the gas phase in the direction of the arrow 30 between the tubes 32, 34 to the (lower) second inlet of the cyclone, which inlet faces away from the cover 20, has already been described. The gas phase subsequently flows through the inner tube and to the heat exchanger as indicated by the arrow 16 and leaves the accumulator through an outlet, not shown, on the bottom. This is where the inlet for the high-pressure medium is located.

According to the invention, the gas thereby enters the cyclone 12 in a substantially axial direction from below and substantially centrally according to the figures, and through the design of the cyclone is given to rotate again, so that it flows radially out of the separator 28 as indicated by the arrow 16 and into the area of the spiral tube 26. As can be seen, the cyclone 12 thereby causes two flows in substantially opposing directions and the cover 20 can be executed comparatively simply, since it can have a single flow path for refrigerant and as the case may be an outlet 38, which can be seen to be substantially vertical in the figure, for the high-pressure medium, but is executed comparatively simply.

Figure 2:
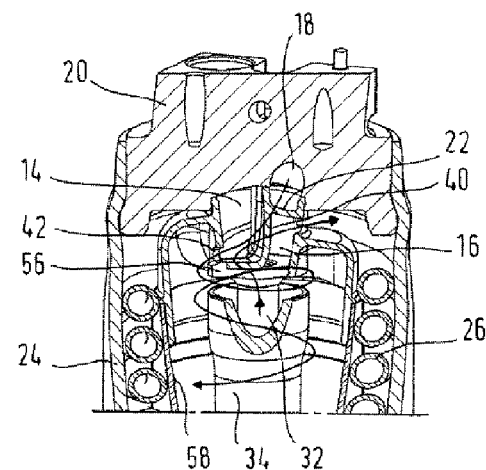
FIG. 2 Perspective cross-section view according to FIG. 1.

A part of the construction shown in FIG. 1 is again represented in FIG. 2. The cover 20, the cyclone connected thereto, its first flow path 14, the second flow path 16 and the partition 22 located between them can be seen. The first flow path 14 extends from the inlet 18 substantially towards the observer, so that the flow (as seen from the cover) is given to rotate anticlockwise in the direction of the window 42 described below. In contrast, the flow coming from the inner tube 32 rotates clockwise and leaves the cyclone 12 to a certain extent through a window 40 leading to the spiral tube 26 of the heat exchanger. For the first flow path 14 is provided a similar window 42 through which the mixed gas and liquid flow flows into the separator 28 and in particular that area in which the liquid is separated. The figures also show that the housing 24, the spiral tube 26, the outer tube 58 of the separator 28, the middle tube 34, the inner tube 32 and the cyclone 12 are all disposed coaxially, although it is just as conceivable that only some or only two of the components mentioned are arranged coaxially to one another.

Figure 3:
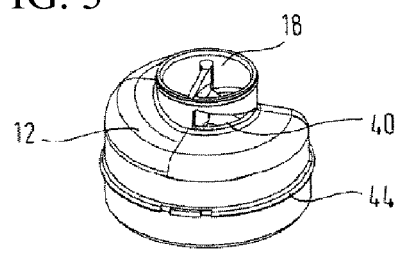
FIG. 3 Representation of the cyclone used in the arrangement of FIGS. 1 and 2.

FIG. 3 represents the cyclone 12 alone, and its inlet 18 and the window 40 leading out of the separator 28 to the heat exchanger and forming the outlet of the separator 28 can be seen. For a defined assembly the cyclone 12 comprises a collar or flange 44, and the substantially cylindrical design of the cyclone and the spiral form of the flow paths caused by the top side of the cyclone outside the inlet 18 can be seen.

Figure 4:
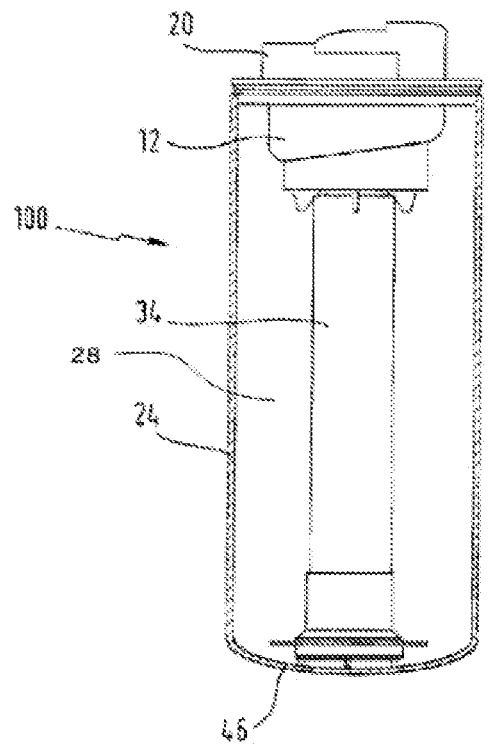
FIG. 4 Section through an accumulator according to the invention without a heat exchanger.

The accumulator 100 without a heat exchanger shown in FIG. 4 in turn comprises a cover 20, a cyclone 12, a housing 24 and a middle tube 34 that could also be arranged eccentrically. The housing 24 is provided with a bottom 46 that can be a separate component. The cover 20 comprises a fitting with the necessary inlet and outlet openings and in the case shown is designed identically to the cover of FIGS. 1 and 2. The inlet and outlet of the actual accumulator are integrated into the cyclone 12.

Figure 5:
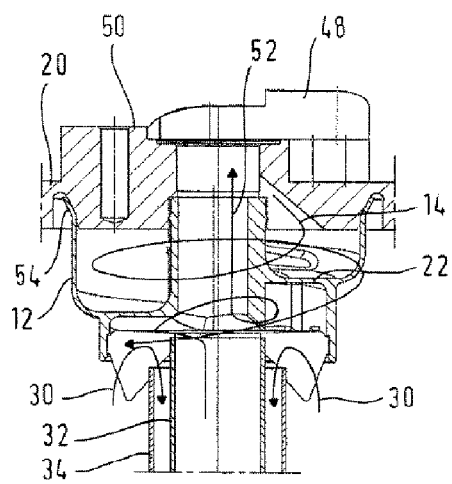
FIG. 5 Section through the upper area according to FIG. 4.

The cover 20 and the cyclone 12 (see also FIG. 6) are shown more precisely in FIG. 5. Additionally, 48 is a fitting with an accumulator outlet and 50 a fitting with an accumulator inlet. The flow path 14 for the inlet flow is indicated similarly to FIG. 1 and leads the mixed gas and liquid flow through the window 42 in a substantially spiral formation to the outside of the middle tube 34 in order to separate the liquid phase there through the centrifugal forces generated by the spiral flow. As indicated by the arrows 30, the gas phase is sucked between the middle tube 34 and the inner tube 32 in the direction of the bottom, where the two tubes 32, 34 are connected. A distributor with an integrated filter through which oil can enter in order to add a defined quantity of oil to the gas phase of the refrigerant is also provided at this lower position in the figures. Furthermore, it should be mentioned that the two tubes 32, 34 are also connected to one another in the area of the cyclone 12 by means of a deflector (56, see FIG. 6). In particular, in the case shown the inner tube 32 and the middle tube 34 are connected with the deflector described below and the upper end of the middle tube 34 is located in a defined position relative to the deflector.

The gas phase is led through the inner tube 32 in the direction of the accumulator outlet 48. In the further course, the opposite side of the spiral track existing in the cyclone for the inlet flow 14 is used in order to lead the gaseous refrigerant to the (in this case) central outlet 48, as indicated by the arrow 52. This outlet substantially corresponds to the window 40 in FIGS. 2 and 3. In the case shown, the cyclone has at its end pointing towards the cover 20 an expanded collar 54 into which a correspondingly inclined portion of the cover 20 is inserted. However, other designs for this connection are also conceivable. At the opposite end facing away from the cover 20 the underside of the cyclone 12 is executed in a rounded concave form in order to deflect in a suitable manner in this area the flow indicated by means of the arrows 30. In addition, this purpose is served by the deflectors 56 also visible in FIG. 6 and distributed at regular intervals around the circumference. The deflectors 56 are formed on a separate component, which in particular allows the cyclone 12 to be manufactured by means of injection moulding, for instance, but to be combined with the deflector component to form a single unit. The component having the deflectors 56 can also be provided in the embodiment of FIGS. 1 and 2 and is identified in FIG. 2.

Figure 6:
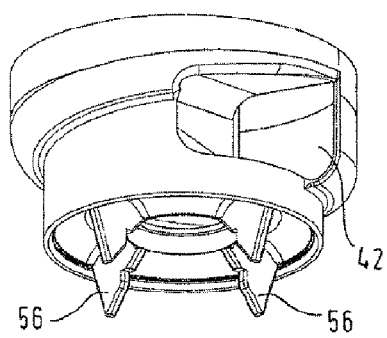
FIG. 6 Perspective representation of the cyclone used in the arrangement of FIGS. 4 and 5.

FIG. 6 also shows the window 42 leading in this case to the interior of the accumulator and through which the refrigerant leaves the cyclone 12, so that in the further course of the flow the separation of liquid can take place as a result of the centrifugal forces.

The invention relates to an accumulator having a cyclone for separation of the gas and liquid phase of a refrigerant, in particular of a vehicle air-conditioning system.

The invention claimed is:

1. An accumulator comprising:
    a cyclone having a spiral flow path through which a refrigerant flows;
    a housing having an open end and accommodating the cyclone;
    a cover coupled to the open end of the housing and having an inlet for introducing the refrigerant into the cyclone closer to an axial direction than a radial direction of the cyclone,
    a separator accommodated in the housing and separating the refrigerant introduced from the cyclone into a gas phase and a liquid phase; and
    a spiral tube accommodated in the housing and through which a medium for heat exchange with the refrigerant in the gas phase separated in the separator flows;
    wherein the cyclone further comprises:
        two separate, spiral flow paths, a first one of the flow paths leads the refrigerant from the inlet into an inside of the separator and radially outwards, and a second one of the flow paths leads the refrigerant from an end of the cyclone facing away from the cover into the spiral tube.

2. The accumulator according to claim 1, wherein the direction of flow of the refrigerant at the inlet is within 45 degrees of the axial direction of the cyclone.

3. The accumulator according to claim 1, wherein at least one of the flow paths is spiral at least in some portions.

4. The accumulator according to claim 1, wherein the cyclone has two windows for discharging the refrigerant in the first one of the flow paths into the inside of the separator and discharging the refrigerant in the second one of the flow paths into the spiral tube, respectively.

5. The accumulator according to claim 1, wherein the flow paths are separated from one another by a single partition.

6. The accumulator according to claim 1, wherein at at least one of the two windows, a partition is oriented substantially perpendicularly to an axis of the cyclone.

7. The accumulator according to claim 1, wherein the cyclone is produced from plastic.

8. The accumulator according to claim 1, wherein the cyclone is produced from a polymer.

9. The accumulator according to claim 1, wherein the cyclone is injection-moulded or printed in 3D.

10. The accumulator according to claim 1, wherein the cover has a single flow path for the refrigerant.

11. The accumulator according to claim 1, wherein the cover is produced in an asymmetric form.

12. An accumulator comprising:
    a cyclone having a spiral flow path through which a refrigerant flows;
    a housing having an open end and accommodating the cyclone;
    a cover coupled to the open end of the housing and having an inlet for introducing the refrigerant into the cyclone closer to an axial direction than a radial direction of the cyclone; and
    a separator accommodated in the housing and separating the refrigerant introduced from the cyclone into a gas phase and a liquid phase;
    wherein the cyclone further comprises:

two separate, spiral flow paths, a first one of the flow paths leads the refrigerant from the inlet into an inside of the separator and radially outwards, and a second one of the flow paths leads the refrigerant from an end of the cyclone facing away from the cover into an accumulator outlet formed in the cover.

\* \* \* \* \*